(12) United States Patent
Asher

(10) Patent No.: US 11,170,790 B2
(45) Date of Patent: Nov. 9, 2021

(54) USER AUTHENTICATION WITH AUDIO REPLY

(71) Applicant: Bose Corporation, Framingham, MA (US)

(72) Inventor: David Joshua Asher, Milford, MA (US)

(73) Assignee: Bose Corporation, Framingham, MA (US)

(*) Notice: Subject to any disclaimer, the term of this patent is extended or adjusted under 35 U.S.C. 154(b) by 188 days.

(21) Appl. No.: 16/454,980

(22) Filed: Jun. 27, 2019

(65) Prior Publication Data

US 2020/0411014 A1  Dec. 31, 2020

(51) Int. Cl.
| | |
|---|---|
| *G10L 17/24* | (2013.01) |
| *G10L 17/06* | (2013.01) |
| *H04W 12/06* | (2021.01) |
| *G06F 21/32* | (2013.01) |
| *G10L 17/04* | (2013.01) |

(52) U.S. Cl.
CPC ............. *G10L 17/24* (2013.01); *G06F 21/32* (2013.01); *G10L 17/04* (2013.01); *G10L 17/06* (2013.01); *H04W 12/06* (2013.01)

(58) Field of Classification Search
CPC ......... G10L 17/24; G10L 17/06; G10L 17/10; G10L 17/04; H04W 12/06; G06F 21/32; H04L 63/0861; H04L 9/3231; H04L 29/06
See application file for complete search history.

(56) References Cited

U.S. PATENT DOCUMENTS

| | | | |
|---|---|---|---|
| 5,339,385 A | 8/1994 | Higgins | |
| 6,510,415 B1 | 1/2003 | Talmor et al. | |
| 7,185,197 B2 | 2/2007 | Wrench, Jr. | |
| 9,767,807 B2 | 9/2017 | Bhaskaran | |
| 2008/0095331 A1 | 4/2008 | Wlasiuk | |
| 2011/0035788 A1* | 2/2011 | White | H04L 9/3231 726/4 |
| 2012/0281885 A1* | 11/2012 | Syrdal | G06K 9/00315 382/116 |
| 2013/0332632 A1* | 12/2013 | Rathi | H04M 1/72409 710/38 |
| 2017/0359334 A1* | 12/2017 | Maddox | G10L 17/06 |
| 2018/0205557 A1* | 7/2018 | Sun | G06Q 20/3223 |
| 2020/0034521 A1* | 1/2020 | Teng | G10L 19/018 |
| 2020/0079320 A1* | 3/2020 | Lacoss-Arnold | B60R 25/2081 |
| 2020/0380526 A1* | 12/2020 | Sanchez Yoldi | G06Q 20/40145 |

* cited by examiner

*Primary Examiner* — Huyen X Vo
(74) *Attorney, Agent, or Firm* — Hoffman Warnick LLC

(57) ABSTRACT

Various implementations include approaches for authenticating user identity with audio-based verification. Certain approaches include: receiving a request to authenticate a user of an audio device; prompting the user of the audio device to speak a verification word or phrase in response to receiving the request; detecting an acoustic response at the audio device or a connected smart device; comparing the detected acoustic response with an acoustic signature of a known user associated with the audio device and the verification word or phrase, wherein the audio device is registered as an authentication device prior to receiving the request to authenticate the user of the audio device; and sending a confirmation response indicating the user of the audio device is the known user in response to the acoustic response corresponding with the acoustic signature and the verification word or phrase.

20 Claims, 5 Drawing Sheets

USER AUTHENTICATION WITH AUDIO REPLY

TECHNICAL FIELD

This disclosure generally relates to authenticating users. More particularly, the disclosure relates to approaches for audio-based user authentication.

BACKGROUND

The proliferation of passwords to manage accounts such as email accounts, e-commerce accounts, healthcare portals, etc. presents many security and verification challenges. For example, users may have several passwords for various distinct accounts that are difficult to remember and/or may require updating on different timelines. Users may also choose easily mimicked passwords in order to avoid forgetting and resetting passwords frequently.

SUMMARY

All examples and features mentioned below can be combined in any technically possible way.

Various implementations include approaches for authenticating user identity with audio-based verification. Certain approaches include: receiving a request to authenticate a user of an audio device from a requesting entity; prompting the user of the audio device to speak a verification word or phrase in response to receiving the request; detecting an acoustic response at the audio device or a connected smart device; comparing the detected acoustic response with an acoustic signature of a known user associated with the audio device and the verification word or phrase, where the audio device is registered as an authentication device prior to receiving the request to authenticate the user of the audio device; and sending a confirmation response to the requesting entity indicating the user of the audio device is the known user in response to the acoustic response corresponding with the acoustic signature and the verification word or phrase.

In some particular aspects, a computer-implemented method of authenticating a user of an audio device includes: receiving a request to authenticate the user of the audio device from a requesting entity; prompting the user of the audio device to speak a verification word or phrase in response to receiving the request; detecting an acoustic response at the audio device or a connected smart device; comparing the detected acoustic response with an acoustic signature of a known user associated with the audio device and the verification word or phrase, where the audio device is registered as an authentication device prior to receiving the request to authenticate the user of the audio device; and sending a confirmation response to the requesting entity indicating the user of the audio device is the known user in response to the acoustic response corresponding with the acoustic signature and the verification word or phrase.

In other particular aspects, an audio device includes: an acoustic transducer having a sound-radiating surface for providing an audio output; at least one microphone for detecting ambient acoustic signals; and a control system coupled with the acoustic transducer and the at least one microphone, the control system configured to authenticate a user of the audio device by performing actions including: receiving a request to authenticate the user of the audio device from a requesting entity; prompting the user of the audio device to speak a verification word or phrase in response to receiving the request; detecting an acoustic response at the audio device or a connected smart device; comparing the detected acoustic response with an acoustic signature of a known user associated with the audio device and the verification word or phrase, where the audio device is registered as an authentication device prior to receiving the request to authenticate the user of the audio device; and sending a confirmation response to the requesting entity indicating the user of the audio device is the known user in response to the acoustic response corresponding with the acoustic signature and the verification word or phrase.

Implementations can include one of the following features, or any combination thereof.

In certain cases, prompting the user of the audio device to speak the verification word or phrase includes triggering an audio output of the verification word or phrase at the audio device.

In particular aspects, prompting the user of the audio device to speak the verification word or phrase includes displaying a visual representation of the verification word or phrase at the connected smart device.

In some cases, the request to authenticate the user is sent by a website or a software application associated with an account for the known user, and comparing the detected acoustic response with the acoustic signature of the known user associated with the audio device is performed at the audio device, the connected smart device, or in a cloud computing network.

In particular implementations, the method further includes sending a rejection response indicating the user of the audio device is not the known user in response to the acoustic response not corresponding with at least one of the acoustic signature or the verification word or phrase.

In certain aspects, the user is associated with the audio device using a password elimination protocol (also referred to as a user-specific verification protocol), and the audio device is registered as an authentication device using the password elimination protocol.

In some implementations, the audio device includes: a wearable audio device or a smart speaker.

In particular cases, the method further includes randomly generating the verification word or phrase in response to receiving the request to authenticate the user of the audio device.

In certain aspects, the method further includes training a voice differentiation engine to recognize the acoustic signature of the known user associated with the audio device.

In certain aspects, the method further includes sending a rejection response to the requesting entity indicating the user of the audio device is not the known user in response to the request timing out.

Two or more features described in this disclosure, including those described in this summary section, can be combined to form implementations not specifically described herein.

The details of one or more implementations are set forth in the accompanying drawings and the description below. Other features, objects and advantages will be apparent from the description and drawings, and from the claims.

Figure 1:
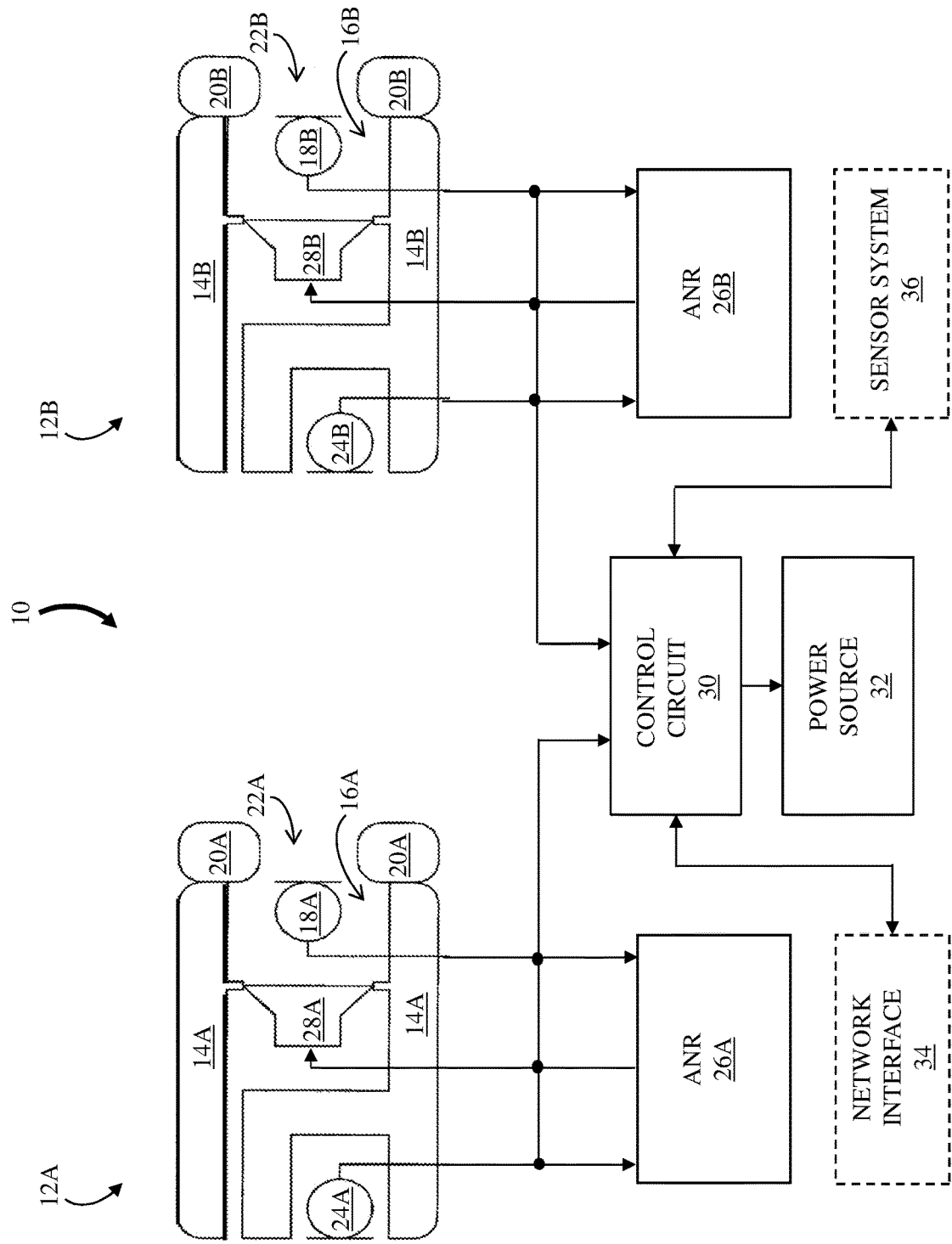
FIG. 1 is a schematic depiction of an audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a user authentication processes can benefit from an audio device, such as an audio device associated with a particular user. For example, approaches can include verifying that an audio device user is a known user associated with that audio device in order to authenticate the user.

Commonly labeled components in the FIGURES are considered to be substantially equivalent components for the purposes of illustration, and redundant discussion of those components is omitted for clarity.

Various implementations include audio devices and related methods for providing user authentication. In particular cases, these implementations rely upon password elimination protocols (which may also be referred to as user-specific verification protocol), such as Fast IDentity Online (FIDO) and/or similar protocols/standards (e.g., Web Authentication (WebAuthn), Universal 2nd Factor (U2F)). These protocols allow for association of a user with a device, e.g., an audio device, a smart device (e.g., smart phone, smart watch or other wearable smart component), a universal serial bus (USB) key, a key fob, etc. Such protocols aim to significantly reduce or eliminate reliance upon passwords. Various implementations can utilize a known user-device relationship to provide additional authentication options. The approaches described according to various implementations can help to mitigate reliance upon passwords, and in some cases, can reduce visual interface interaction (e.g., with a smartphone or other display device) when compared with conventional authentication approaches. The implementations disclosed herein can enhance authentication processes relative to conventional approaches, while enhancing the user experience.

Audio Device

Aspects and implementations disclosed herein are applicable to a wide variety of audio devices, including personal audio devices such as a portable speaker, headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed are particularly applicable to personal (wearable) audio devices such as glasses, headphones, earphones or other head-mounted audio devices. It should be noted that although specific implementations of personal audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 are disposed within cavity 16. In implementations where personal audio device (or simply, audio device) 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include active noise reduction (ANR), the inner microphone 18 includes a feedback microphone and the outer microphone 24 includes a feedforward microphone. In such implementations, each earphone 12 includes an ANR circuit 26 that is in communication with the inner and outer microphones 18 and 24 for providing noise reduction functions. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback can be initiated, paused or resumed, a notification to a user (e.g., wearer) is provided or altered, and a device in communication with the personal audio device is controlled. The audio device 10 also includes a power source 32. The control circuit 30 and power source 32 can be in one or both of the earpieces 12 or can be in a separate housing in communication with the earpieces 12. The audio device 10 can also include a network interface 34 to provide communication between the audio device 10 and one or more audio sources and other personal audio devices. The network interface 34 can be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 can be located remotely from audio device 10. The network interface 34 can provide for communication between the audio device 10, audio sources and/or other networked (e.g., wireless) speaker packages and/or other audio playback devices via one or more communications protocols. The network interface 34 can provide either or both of a wireless interface and a wired interface. The wireless interface can allow the audio device 10 to communicate wirelessly with other devices in accordance with any communication protocol noted herein. In some particular cases, a wired interface can be used to provide network interface functions via a wired (e.g., Ethernet) connection.

Additional description of the control circuit 30 (e.g., including memory and processing function), network interface 34 (e.g., including network media processor functions) and other features of the audio device 10 can be found in U.S. patent application Ser. No. 16/179,205 ("Spatialized Virtual Personal Assistant"), filed on Nov. 2, 2018, which is herein incorporated by reference in its entirety.

As shown in FIG. 1, audio device 10 can also include a sensor system 36 coupled with control circuit 30 for detecting one or more conditions of the environment proximate audio device 10. Sensor system 36 can include inner microphones 18 and/or outer microphones 24, sensors for detecting inertial conditions at the audio device 10 and/or conditions of the environment proximate audio device 10 as described herein. The sensors are on-board the audio device 10, or are remote or otherwise wirelessly (or hard-wired) connected to the audio device 10.

In various implementations, the sensor system 36 can be located at the audio device 10. In some examples, the sensor system 36 can also include one or more interface(s) for receiving commands at the audio device 10. For example, sensor system 36 can include an interface permitting a user to initiate functions of the audio device 10. In a particular example implementation, the sensor system 36 can include, or be coupled with, a capacitive touch interface for receiving tactile commands on the audio device 10.

In other implementations, as illustrated in the phantom depiction in FIG. 1, one or more portions of the sensor system 36 can be located at another device capable of indicating inertial, location, or other information about the user of the audio device 10. For example, in some cases, the sensor system 36 can include an IMU physically housed in a hand-held device such as a pointer, or in another wearable audio device. In particular example implementations, at least one of the sensors in the sensor system 36 can be housed in a wearable audio device distinct from the personal audio device 10, such as where audio device 10 includes headphones and an IMU is located in a pair of glasses, a watch or other wearable electronic device.

Data Flow

Figure 2:
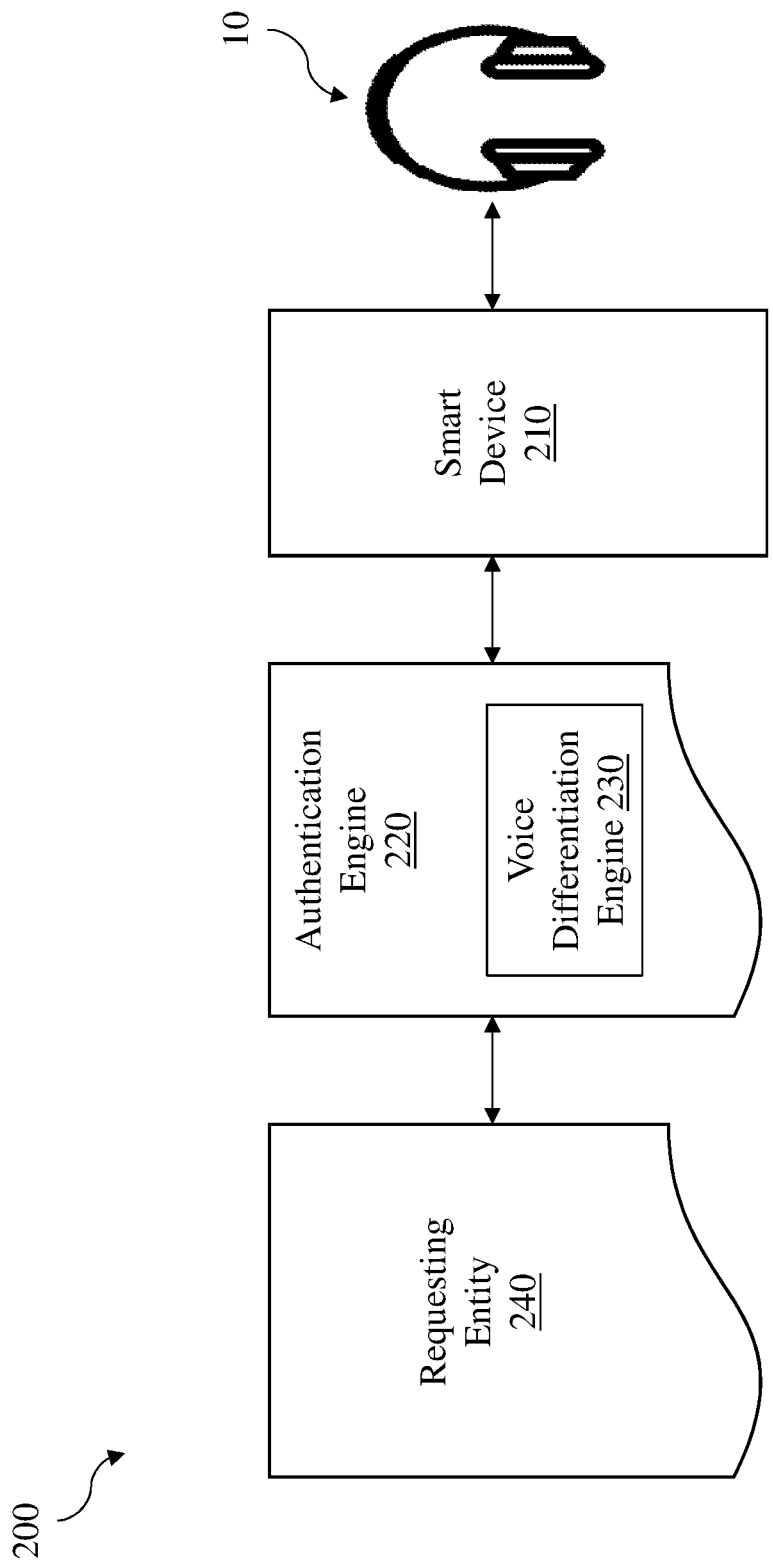
FIG. 2 is a schematic data flow diagram illustrating processes performed by an authentication engine according to various implementations.

As described with respect to FIG. 1, control circuit 30 can execute (and in some cases store) instructions for controlling authentication functions in audio device 10 and/or other audio playback devices in a network of such devices. FIG. 2 shows a schematic depiction of data flows in a system 200 including the personal audio device (or simply, audio device) 10 connected with a smart device 210. It is understood that one or more components shown in the data flow diagrams herein can be integrated in the same physical housing, e.g., in the housing of audio device 10, or can reside in one or more separate physical locations.

In various implementations, the smart device 210 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 210 can include a conventional user interface for permitting interaction with a user, and can include one or more network interfaces for interacting with the control circuit 30 and other components in audio device 10. The audio device 10 and the smart device 210 can be paired according to any connection described herein, e.g., a wireless connection such as Bluetooth, WiFi or Zigbee. In various implementations, the smart device 210 acts as an audio gateway for the audio device 10. In particular implementations, the smart device 210 includes a network interface, which can include similar network interface components as described with reference to the network interface 34 of audio device 10, e.g., a wireless transceiver configured to communicate over any wireless protocol described herein.

The smart device 210 can further include a control system configured to execute authentication functions at the audio device 10. The control system can include a microprocessor, memory, and other conventional control hardware/software for executing functions described herein. In some cases, the control system can include similar components as those described with respect to control circuit 30 in FIG. 1. In various implementations, the control system in the smart device 210 can have additional processing and/or storage capabilities not present at the control circuit 30 in audio device 10.

In some implementations, the smart device 210 is connected with an authentication engine 220 that is configured to perform authentication functions described herein. The authentication engine 220 can include logic for executing authentication functions described herein. Additionally, the smart device 210 can include hardware and/or firmware (e.g., as part of the authentication engine 220 or separately) that is specific to the secure implementation of a password elimination protocol such as FIDO2, WebAuthn, U2F or similar protocols.

In various implementations, the authentication engine 220 (including logic, related software and/or hardware) can be located at the audio device 10, smart 210 or any other device described herein (e.g., at a cloud-computing server, Internet-based server or other distributing computing platform). That is, the authentication engine 220 can be configured to execute functions at one or more devices and/or components described herein. In some cases, the authentication engine 220 takes the form of an entirely hardware implementation, an entirely software implementation (including firmware, resident software, micro-code, etc.) or an implementation combining software and hardware aspects that may all generally be referred to herein as an "engine." In particular implementations, the authentication engine 220 takes the form of a computer program product embodied in any tangible medium of expression having computer-usable program code embodied in the medium. In various particular implementations, the authentication engine 220 executes functions described herein according to logic, which can be stored or otherwise accessed by any device capable of performing those functions, e.g., smart device 210, audio device 10 or other device(s) described herein.

In various implementations, the authentication engine 220 can include a voice differentiation engine 230 for analyzing acoustic signals according to various implementations. In particular cases, the voice differentiation engine 230 is configured to recognize acoustic signature(s) of known user(s) associated with the audio device 10 for the purposes of authenticating the user(s).

The authentication engine 220 is configured to communicate with a requesting entity 240. The requesting entity 240 can include a website or software application that communicates with the authentication engine 220, e.g., via the Internet or a cloud-based communication protocol. In certain cases, the requesting entity 240 includes a financial institution, a data storage organization, a communications system (e.g., email server), or any other entity that can benefit from the authentication functions described herein.

Figure 3:
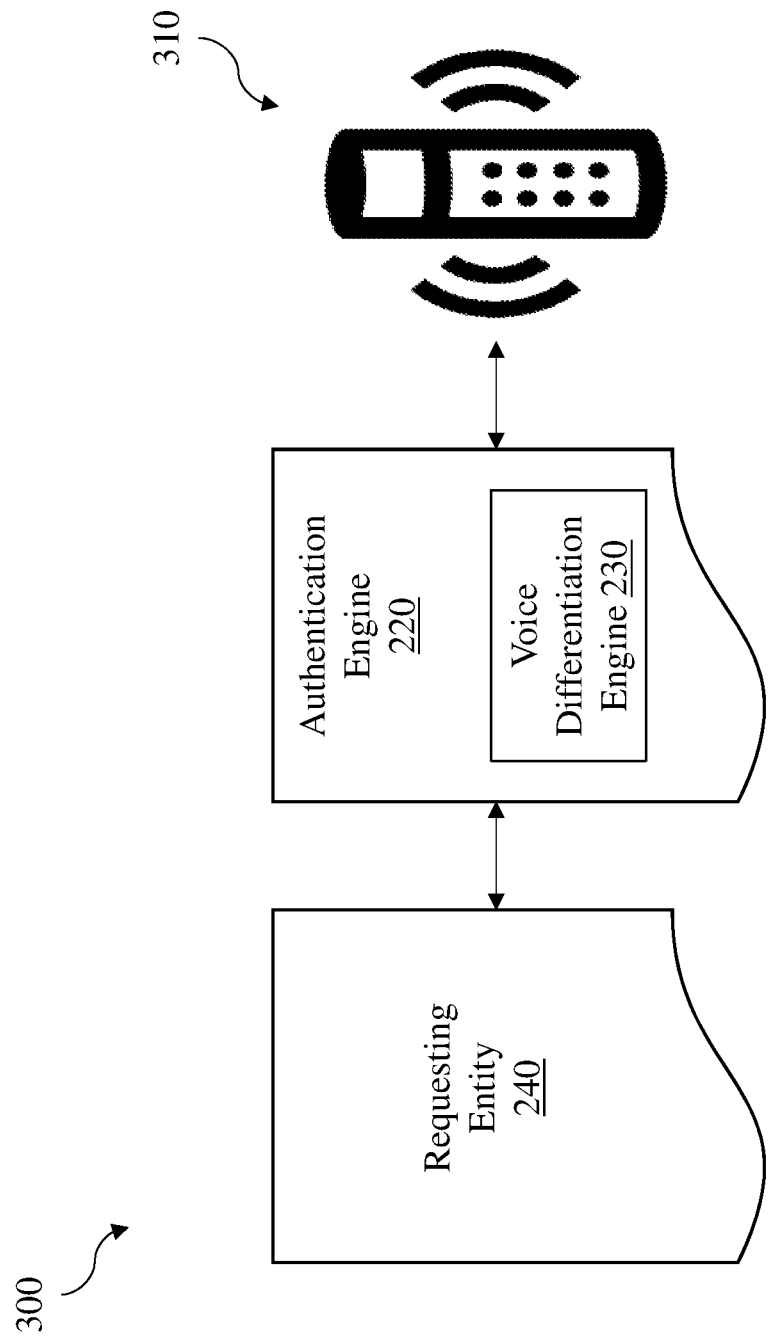
FIG. 3 is a schematic data flow diagram illustrating processes performed by an authentication engine according to various additional implementations.

FIG. 3 shows an additional schematic depiction of data flows in a system 300 including an audio device 310 connected with the authentication engine 220, which is in turn connected with the requesting entity 240. In these cases, as compared with system 300, the audio device 310 can include a smart speaker system (e.g., one or more speakers) with processing components, logic and audio components (e.g., transducers and microphones) for executing functions described with reference to the audio device 10 and/or smart device 210 in FIG. 2.

Example Process Flow

Figure 4:
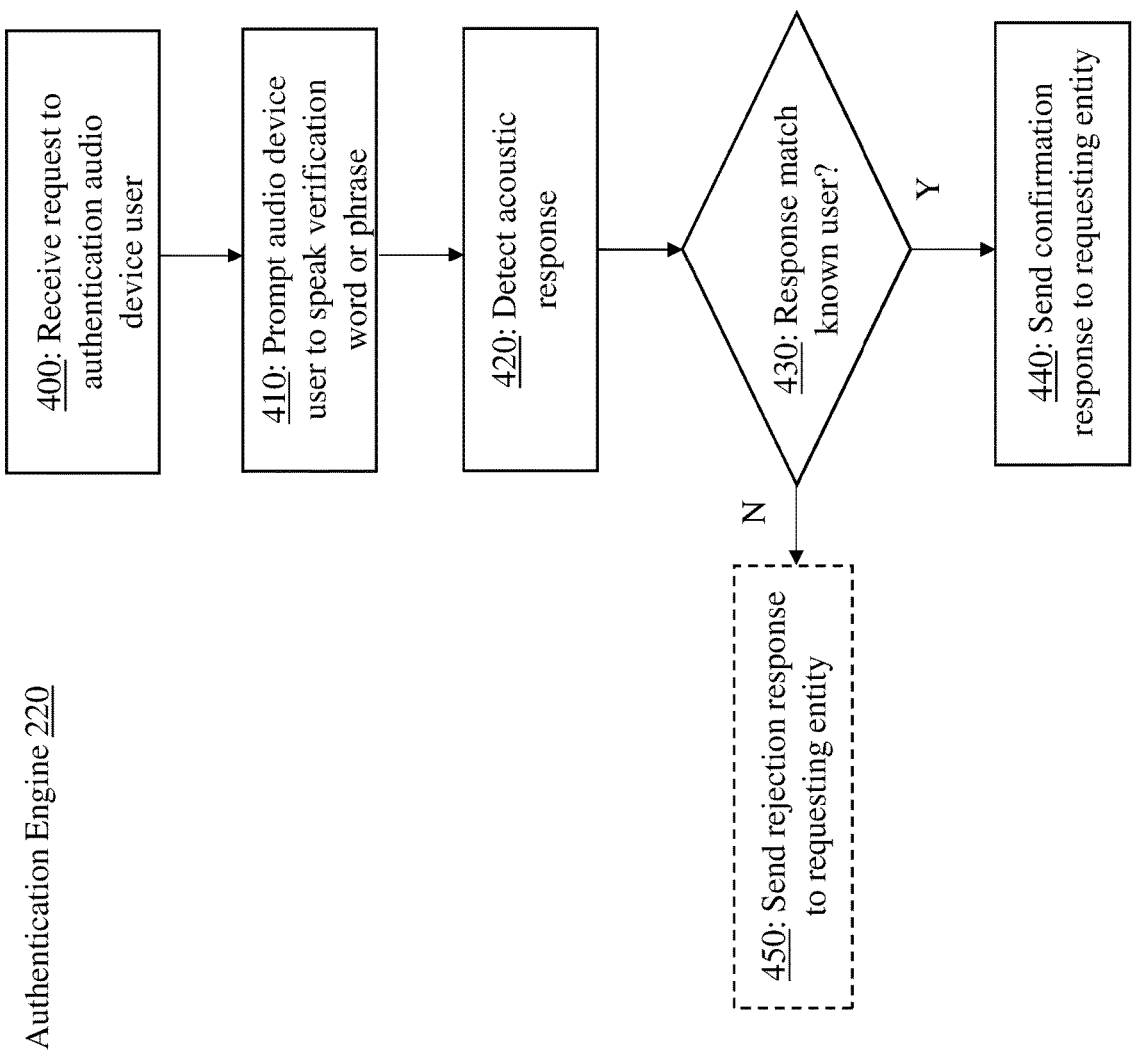
FIG. 4 is a process flow diagram illustrating processes performed by the authentication engine shown in FIG. 2 and FIG. 3.

Processes performed according to various implementations are applicable to both systems 200 and 300, illustrated in FIGS. 2 and 3. FIG. 4 is a flow diagram illustrating processes performed by the authentication engine 220 for authenticating the user of an audio device (e.g., audio device 10 or audio device 310). FIGS. 2-4 are referred to collectively.

Process 400: the authentication engine 220 receives a request to authenticate the user of the audio device (e.g., audio device 10 or audio device 310). In various implementations, the request to authenticate the user is sent by the requesting entity 240, e.g., a website or a software application associated with an account for a known user. In some cases, the authentication request is triggered when the user attempts to login to a secure system associated with the requesting entity 240.

As described herein, the terms "user" and "known user" are differentiated in that the known user is a user (e.g., a person) that already has an association with the audio device (e.g., audio device 10 or audio device 310). The processes described according to various implementations have the goal of determining whether the current user of the audio device (e.g., audio device 10 or audio device 310) is the known user. In some cases, the authentication request is sent via a conventional authentication protocol such as WebAuthn, FIDO2 or U2F (e.g., via U2F Tokens).

Process 410: in response to receiving the request to authenticate the user, the authentication engine 220 prompts the user of the audio device (e.g., audio device 10 or audio device 310) to speak a verification word or phrase. In some cases, the word or phrase can include a single word or a number (e.g., "headphones", "office", "forty-two", or "eight-hundred-fifty"), a phrase (e.g., "The Red Sox won the World Series" or, "I love my Bose headphones"), a passage (e.g., "Humpty dumpty sat on a wall. Humpty dumpty had a great fall . . . ") or a combination of words and/or numbers (e.g., "Kelvin 505", "Michael 23 Jordan", three seven eight two", or "brown jump chicken"). Thus, the verification phrase (when a verification word is not utilized) need not have any logical construction. In various implementations, the authentication engine 220 is configured to randomly generate the verification word or phrase in response to receiving the request to authenticate the user. That is, the authentication engine 220 can include a random word and/or random phrase generator for generating a verification word or phrase on command (e.g., within a manner of seconds). In particular cases, the random word/random phrase generator can be configured to generate a verification word or phrase with the following criteria: (1) the verification word or phrase is short, e.g., not more than 2-3 words, so that the user can easily remember and repeat the phrase; (2) the word(s) are commonly used in everyday vernacular or parlance, so that they are unlikely to confuse the known user; and (3) the pattern of generating verification words or phrases is highly random and unpredictable, in order to thwart a replay attack.

The user can be prompted to speak the verification word or phrase in any number of ways. For example, the authentication engine 220 can trigger audio output of the verification word or phrase at the audio device (e.g., at transducers on the audio device 10 or audio device 310), such that the user can hear the verification word or phrase as playback at that audio device. In other cases, the authentication engine 220 can trigger display of a visual representation of the verification word or phrase at the audio device (e.g., audio device 10 or audio device 310) and/or the smart device 210. For example, the authentication engine 220 can instruct the audio device and/or smart device 210 to display the verification word or phrase at a display (e.g., on the audio device or the smart device 210), for example, in text form and/or in an additional visual format such as picture(s), descriptors, etc.

Process 420: using the audio device (e.g., audio device 10 or audio device 310), the authentication engine 220 can detect an acoustic response (e.g., at microphone(s) 24 or similar microphone(s) on the audio device 310). In some cases, the acoustic response must be detected within a response period following the prompt to speak the verification word or phrase. If the response is not detected within that response period, the verification cycle will timeout and result in an automatic rejection signal back to the password-elimination authentication protocol.

Decision 430: after detecting the acoustic response, the authentication engine 220 can compare that response with an acoustic signature of a known user associated with the audio device (e.g., audio device 10 or audio device 310). This process also includes verifying that the acoustic response includes the verification word or phrase prompted in process 410. As noted herein, the known user is associated with the audio device 10 using a password elimination protocol or user-specific verification protocol such as FIDO or FIDO2 (or WebAuthn or U2F). This association is established prior to initiating the verification processes described herein. Additionally, the audio device (e.g., audio device 10 or audio device 310) is registered as an authentication device prior to receiving the request to authenticate the user of that device (process 400), e.g., using the password elimination protocol. In various implementations, a user can register his/her audio device as an authentication device using one or more of the password elimination protocols described herein and/or known in the art. In some cases, this process is performed at device setup (e.g., in a preliminary process prior to process 400) and can include registering the device's unique digital identifier (e.g., as imprinted at the device's manufacturing facility) with the user (e.g., purchaser or first user of the device), and is typically registered with a cloud service that is a trusted service provider.

In additional implementations, e.g., at the time of device setup, the authentication engine 220 is configured to train the voice differentiation engine 230 to recognize the acoustic signature of the known user associated with the audio device (e.g., audio device 10 or audio device 310). This voice training process can include prompting the known user (e.g., initial user and/or device purchaser) to speak a number of words or phrases such that the voice differentiation engine 230 can identify the acoustic signature of that known user. In some cases, the voice training process can include prompting the known user to speak for a defined period (e.g., seconds or minutes), or can include using microphone(s) at the audio device to detect the user's speech over an extended period (such as a number of days or weeks) or on a periodic basis. In additional implementations, one or more known users can be associated with a given audio device (e.g., audio device 10 and/or audio device 310). For example, if a speaker system (e.g., a smart speaker) is located in an area likely to be accessed by multiple people, the authentication engine 220 is configured to perform verification for multiple known users, while excluding other users. In a particular example, a speaker system having the authentication engine 220 is located in common area of a home or workplace, and some users (e.g., parents, or workers stationed in that area) can register as known users while others (e.g., children, or people not stationed in that area) cannot register as known users.

In particular implementations, the voice differentiation engine 230 is configured to differentiate the known user's voice from a set of other users' voices. In this sense, voice differentiation engine 230 has a relaxed confidence threshold for declaring a true positive confirmation of the known user's voice (and not declaring a false positive) as compared with a speaker identification system that is capable of identifying a particular user's voice. This voice differentiation engine 230 may require less training and/or fewer computational resources (and less time) to perform voice differentiation than a conventional speaker identification system.

As noted herein, the voice differentiation engine 230 can also be configured to detect the content of the acoustic response in order to perform user verification. That is, the voice differentiation engine 230 is configured to identify words and/or phrases in the user's speech (acoustic response) and compare those words and/or phrases with the previously generated verification word or phrase.

The voice differentiation engine 230 can be configured to perform one or more of the following logic processes using data about the acoustic signals detected at the microphone, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice and acoustic event detection, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

Process 440: In response to the acoustic response corresponding with the acoustic signature of the known user and the verification word or phrase, the authentication engine 220 is configured to send a confirmation response to the requesting entity 240 indicating that the user is the known user. In some implementations, confirmation of authentication is provided to the user in the form of audio, visual and/or tactile feedback.

Process 450: In response to the acoustic response not corresponding with the acoustic signature of the known user and the verification word or phrase, the authentication engine 220 is configured to send a rejection response to the requesting entity 240 indicating that the user is not the known user. In some variations of this approach, the authentication engine 220 does not send a response to the requesting entity 240 where the acoustic response does not correspond with acoustic signature of the known user and the verification word or phrase. Accordingly, the process of sending the rejection response is indicated in phantom. In some implementations, if either the acoustic response or the verification word or phrase is improper (or does not exceed required corresponding thresholds), then the request for authentication continues to decision 430 to allow the user to try again. In some such implementations, the user is allowed only a finite number of attempts (e.g., two, three, four, five, etc.) before some action is taken (e.g., return to process 400, lock the user from trying to authenticate for a period of time, notify the device owner that multiple failed attempts have been performed, etc.).

In still further implementations, the request for authentication times out, such that a prescribed period elapses between the sending of the authentication request and the receiving of the confirmation or rejection response. In these cases, the authentication process will need to be re-initiated in order to verify the user of the audio device 10 after the prescribed period has elapsed, e.g., after a number of seconds or minutes.

Figure 5:
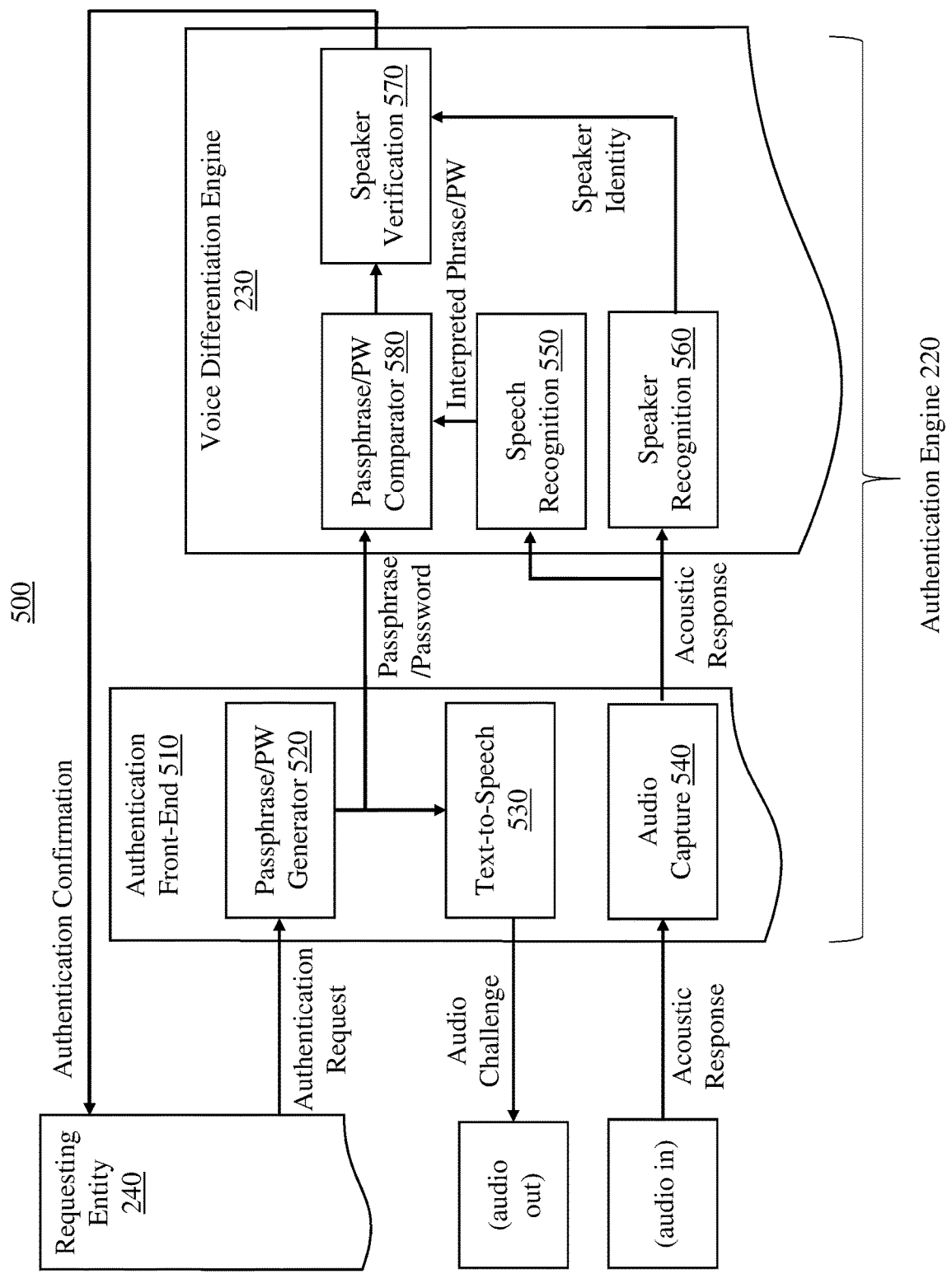
FIG. 5 is a schematic data flow diagram illustrating example processes performed by an authentication engine according to various particular implementations.

FIG. 5 is an example detailed data flow diagram 500 illustrating select processes from the flow diagram in FIG. 4. Data flow diagram 500 illustrates processes performed by the authentication engine 220 in communication with the requesting entity 240. In this particular example, the requesting entity 240 sends an authentication request to the authentication front-end 510 of the authentication engine 220. The authentication front-end 510 includes a passphrase/password (PW) generator 520 for generating a password and/or passphrase for speaker verification as described herein. The passphrase/password generator 520 sends that generated password and/or passphrase to a text-to-speech converter 530 that converts the text of that password and/or passphrase to speech for audio output as an audio challenge (e.g., verification word or phrase). The authentication front-end 510 subsequently receives an acoustic response (e.g., via microphones) as described herein, and captures that response at an audio capture component 540. That captured response is then sent to a speech recognition component 550 and a speaker recognition component 560 in the voice differentiation engine 230. The speaker recognition engine 560 is configured to compare the acoustic signature of the response with a stored (or otherwise accessible) acoustic response for one or more known users, as described herein. That is, the speaker recognition component 560 is configured to determine that the acoustic response is coming from one or more particular users (within a confidence level appropriate for differentiation) and send a speaker identity finding to a speaker verification component 570. The speech recognition component 550 is configured to recognize the substance of the speech in the acoustic response, that is, the word(s) and/or phrase(s) in the acoustic response. The speech recognition component 550 sends an interpreted phrase to a passphrase/password comparator 580, which has already received the generated passphrase from the passphrase/password generator 520. The passphrase/password comparator 580 compares the passphrase/password with the interpreted phrase to determine whether the interpreted phrase/password corresponds with (e.g., matches exactly, matches within an acceptable level of deviation, or otherwise includes) the passphrase. The passphrase comparator 580 communicates with the speaker verification component 570 to indicate whether the interpreted phrase/ password corresponds with the generated password/passphrase. If both the password/passphrase and the speaker identity are verified, the authentication engine 220 sends a confirmation response to the requesting entity 240. As noted herein, if one of the passphrase/password verification or the speaker identification is not confirmed, the authentication engine 220 will not confirm the user of the audio device user as the known user. That is, in these implementations, the authentication engine 220 requires both speaker identification and password/passphrase verification in order to confirm the audio device user as the known user.

The approaches described according to various implementations can provide a highly secure mechanism for authenticating a user. That is, the combination of a known device association with recitation of a temporary, non-repeating voice response provides the requesting entity 240 with confidence that the audio device 10 user is the same as the known user. These approaches also reduce the need for users to remember passwords, as the user can be authenticated with high confidence using his/her registered audio device 10 and voice. Even further, these approaches may not require the user to interact with a screen, making authentication less intrusive. In any case, the authentication engine 220 has the technical effect of authenticating an audio device user.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of different implementations described herein can be combined to form other embodiments not specifically set forth above. Elements may be left out of the structures described herein without adversely affecting their operation. Furthermore, various separate elements may be combined into one or more individual elements to perform the functions described herein.

In various implementations, electronic components described as being "coupled" or "connected" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

I claim:

1. A computer-implemented method of authenticating a user of an audio device, the method comprising:
    at a device setup phase for the audio device: registering the audio device as an authentication device by registering a unique digital identifier of the audio device with the user at a trusted service provider; and
    after the device setup phase:
        receiving a request to authenticate the user of the audio device from a requesting entity;
        prompting the user of the audio device to speak a verification word or phrase in response to receiving the request;
        detecting an acoustic response at the audio device or a connected smart device, wherein the audio device comprises a wearable audio device and the connected smart device is separate from the wearable audio device;
        comparing the detected acoustic response with an acoustic signature of a known user associated with the audio device and the verification word or phrase; and
        sending a confirmation response to the requesting entity indicating the user of the audio device is the known user in response to the acoustic response corresponding with the acoustic signature and the verification word or phrase.

2. The computer-implemented method of claim 1, wherein prompting the user of the audio device to speak the verification word or phrase includes triggering an audio output of the verification word or phrase at the audio device.

3. The computer-implemented method of claim 1, wherein prompting the user of the audio device to speak the verification word or phrase includes displaying a visual representation of the verification word or phrase at the connected smart device.

4. The computer-implemented method of claim 1, wherein the requesting entity comprises a website or a software application associated with an account for the known user, and wherein comparing the detected acoustic response with the acoustic signature of the known user associated with the audio device is performed at the audio device, the connected smart device, or in a cloud computing network.

5. The computer-implemented method of claim 1, further comprising sending a rejection response to the requesting entity indicating the user of the audio device is not the known user in response to the acoustic response not corresponding with at least one of the acoustic signature or the verification word or phrase.

6. The computer-implemented method of claim 1, wherein the user is associated with the audio device using a password elimination protocol comprising at least one of Fast Identity Online (FIDO), FIDO2, Web Authentication (WebAuthn) or Universal 2nd Factor (U2F), and wherein the audio device is registered as an authentication device using the password elimination protocol.

7. The computer-implemented method of claim 1, wherein the wearable audio device comprises headphones or audio eyeglasses.

8. The computer-implemented method of claim 1, further comprising:
randomly generating the verification word or phrase in response to receiving the request to authenticate the user of the audio device; and
training a voice differentiation engine to recognize the acoustic signature of the known user associated with the audio device.

9. The computer-implemented method of claim 1, further comprising sending a rejection response to the requesting entity indicating the user of the audio device is not the known user in response to the request timing out.

10. The computer-implemented method of claim 1, wherein comparing the detected acoustic response with an acoustic signature of a known user associated with the audio device and the verification word or phrase is performed by a voice differentiation engine, wherein the voice differentiation engine has a relaxed confidence threshold for declaring a true positive confirmation of the acoustic signature of the known user.

11. An audio device comprising:
an acoustic transducer having a sound-radiating surface for providing an audio output;
at least one microphone for detecting ambient acoustic signals; and
a control system coupled with the acoustic transducer and the at least one microphone, the control system configured to authenticate a user of the audio device by performing actions comprising:
at a device setup phase for the audio device: registering the audio device as an authentication device by registering a unique digital identifier of the audio device with the user at a trusted service provider; and
after the device setup phase:
receiving a request to authenticate the user of the audio device from a requesting entity;
prompting the user of the audio device to speak a verification word or phrase in response to receiving the request;
detecting an acoustic response at the audio device or a connected smart device;
comparing the detected acoustic response with an acoustic signature of a known user associated with the audio device and the verification word or phrase; and
sending a confirmation response to the requesting entity indicating the user of the audio device is the known user in response to the acoustic response corresponding with the acoustic signature and the verification word or phrase,
wherein the audio device comprises a smart speaker and the connected smart device is separate from the audio device.

12. The audio device of claim 11, wherein the control system prompts the user to speak the verification word or phrase by triggering an audio output of the verification word or phrase at the acoustic transducer at the smart speaker.

13. The audio device of claim 11, wherein prompting the user to speak the verification word or phrase includes instructing the connected smart device to display a visual representation of the verification word or phrase.

14. The audio device of claim 11, wherein the requesting entity comprises a website or a software application associated with an account for the known user, and wherein comparing the detected acoustic response with the acoustic signature of the known user associated with the audio device is performed at the audio device, the connected smart device, or in a cloud computing network.

15. The audio device of claim 11, wherein the control system is further configured to send a rejection response indicating the user of the audio device is not the known user in response to the acoustic response not corresponding with at least one of the acoustic signature or the verification word or phrase.

16. The audio device of claim 11, wherein the user is associated with the audio device using a password elimination protocol, and wherein the audio device is registered as an authentication device using the password elimination protocol.

17. The audio device of claim 11, wherein the control system is configured to:
randomly generate the verification word or phrase in response to receiving the request to authenticate the user of the audio device; and
train a voice differentiation engine to recognize the acoustic signature of the known user associated with the audio device.

18. The audio device of claim 11, wherein the control system is further configured to send a rejection response to the requesting entity indicating the user of the audio device is not the known user in response to the request timing out.

19. A computer-implemented method of authenticating a user of an audio device including a wearable audio device comprising headphones or audio eyeglasses, the method comprising:
at a device setup phase for the wearable audio device: registering the wearable audio device as an authentication device by registering a unique digital identifier of the wearable audio device with the user at a trusted service provider;
receiving a request to authenticate the user of the wearable audio device from a requesting entity;
prompting the user of the wearable audio device to speak a verification word or phrase in response to receiving the request;
detecting an acoustic response at the wearable audio device or a connected smart device, wherein the connected smart device is separate from the wearable audio device;
comparing the detected acoustic response with an acoustic signature of a known user associated with the wearable audio device and the verification word or phrase, wherein the user is associated with the wearable audio device using a password elimination protocol comprising at least one of Fast Identity Online (FIDO), FIDO2, Web Authentication (WebAuthn) or Universal 2nd Factor (U2F),
wherein the wearable audio device is registered as the authentication device prior to receiving the request to authenticate the user of the wearable audio device, and wherein the wearable audio device is registered as the authentication device using the password elimination protocol; and
sending a confirmation response to the requesting entity indicating the user of the wearable audio device is the known user in response to the acoustic response corresponding with the acoustic signature and the verification word or phrase.

20. The computer-implemented method of claim 19, wherein prompting the user of the audio device to speak the verification word or phrase includes triggering an audio output of the verification word or phrase at the audio device.

\* \* \* \* \*